US007069256B1

(12) United States Patent
Campos

(10) Patent No.: US 7,069,256 B1
(45) Date of Patent: Jun. 27, 2006

(54) NEURAL NETWORK MODULE FOR DATA MINING

(75) Inventor: Marcos M. Campos, Cambridge, MA (US)

(73) Assignee: Oracle International Corporation, Redwood Shores, CA (US)

( * ) Notice: Subject to any disclaimer, the term of this patent is extended or adjusted under 35 U.S.C. 154(b) by 751 days.

(21) Appl. No.: 10/152,731

(22) Filed: May 23, 2002

(51) Int. Cl.
*G06F 15/18* (2006.01)
(52) U.S. Cl. .......................................... 706/16; 706/25
(58) Field of Classification Search ................. 706/16, 706/25
See application file for complete search history.

(56) References Cited

U.S. PATENT DOCUMENTS

| | | | |
|---|---|---|---|
| 5,970,482 A * | 10/1999 | Pham et al. .................... | 706/16 |
| 6,266,668 B1 * | 7/2001 | Vanderveldt et al. .......... | 707/10 |
| 6,704,717 B1 * | 3/2004 | Tate .............................. | 706/15 |
| 6,865,573 B1 * | 3/2005 | Hornick et al. ................ | 707/6 |
| 6,873,984 B1 * | 3/2005 | Campos et al. ................ | 707/6 |
| 6,912,533 B1 * | 6/2005 | Hornick ......................... | 707/10 |
| 6,941,318 B1 * | 9/2005 | Tamayo et al. .............. | 707/102 |
| 2002/0138492 A1 * | 9/2002 | Kil ............................... | 707/100 |
| 2003/0065636 A1 * | 4/2003 | Peyrelevade .................. | 706/62 |
| 2003/0105731 A1 * | 6/2003 | Lapointe et al. .............. | 706/15 |
| 2005/0177549 A1 * | 8/2005 | Hornick ......................... | 707/1 |

OTHER PUBLICATIONS

Fung et al, "An Intelligent Data Analysis Approach Using Self-Organising-Maps", IEEE ICONIP, Nov. 1999.*
Ilona Jagielska, "Linguistic Rule Extraction from Neural Networks for Descreptive Datamining", IEEE Second International Conference on Knowledge-Based Intelligent Electronic Systems, Apr. 1998.*

* cited by examiner

*Primary Examiner*—George Davis
(74) *Attorney, Agent, or Firm*—Bingham McCutchen LLP

(57) ABSTRACT

A system, software module, and computer program product for performing neural network based data mining that improved performance in model building, good integration with the various databases throughout the enterprise, flexible specification and adjustment of the models being built, and flexible model arrangement and export capability. The software module for performing neural network based data mining in an electronic data processing system comprises: a model setup block operable to receive client input including information specifying a setup of a neural network data mining models, generate the model setup, generate parameters for the model setup based on the received information, a modeling algorithms block operable to select and initialize a neural network modeling algorithm based on the generated model setup, a model building block operable to receive training data and build a neural network model using the training data and the selected neural network modeling algorithm and a model scoring block operable to receive scoring data and generate predictions and/or recommendations using the scoring data and the neural network model.

27 Claims, 10 Drawing Sheets

Fig. 8

| | 802 DATA TABLE | | | |
|---|---|---|---|---|
| | COLUMN 1 | COLUMN 2 NAME ADDRESS | ••• | COLUMN N |
| RECORD 1 | NAME 1 | ADD. 1 | | ••• |
| ••• | | | | |
| RECORD N | NAME N | ADD. N | | ••• |

806A
806B 804A
804N

NEURAL NETWORK MODULE FOR DATA MINING

FIELD OF THE INVENTION

The present invention relates to a neural network module that generates and applies neural network data mining models.

BACKGROUND OF THE INVENTION

Data mining is a technique by which hidden patterns may be found in a group of data. True data mining doesn't just change the presentation of data, but actually discovers previously unknown relationships among the data. Data mining is typically implemented as software in or in association with database systems. Data mining includes several major steps. First, data mining models are generated based on one or more data analysis algorithms. Initially, the models are "untrained", but are "trained" by processing training data and generating information that defines the model. The generated information is then deployed for use in data mining, for example, by providing predictions of future behavior based on specific past behavior.

Data mining is a compute intensive and complex task. Enterprise data mining, that is, data mining that is performed using all or substantial portions of the data generated by an enterprise, requires the mining of very large datasets. Such datasets may include millions of records and it may take hours or even days to build a single model based on such a dataset.

Problems arise when attempts are made to utilize current data mining systems to perform enterprise data mining. Current systems that perform neural network analysis tend to provide inadequate performance for large datasets, and in particular, do not provide scalable performance. This leads to it taking hours or even days to build a single model. In the context of enterprise data mining, a wide variety of models must be generated to meet specific, but widely different needs throughout the enterprise. A typical enterprise has a variety of different databases from which data is drawn in order to build the models. Current systems do not provide adequate integration with the various databases throughout the enterprise. Likewise, current systems provide limited flexibility in terms of specifying and adjusting the model being built to meet specific needs. Likewise, the various models that are built must be arranged so as to operate properly on the particular system within the enterprise for which the models were built. Current systems provide limited model arrangement and export capability.

A need arises for a technique by which neural network analysis may be performed that provides improved performance in model building, good integration with the various databases throughout the enterprise, flexible specification and adjustment of the models being built, and flexible model arrangement and export capability.

SUMMARY OF THE INVENTION

The present invention is a system, software module, and computer program product for performing neural network based data mining that improved performance in model building, good integration with the various databases throughout the enterprise, flexible specification and adjustment of the models being built, and flexible model arrangement and export capability. The software module for performing neural network based data mining in an electronic data processing system comprises: a model setup block operable to receive client input including information specifying a setup of a neural network data mining models, generate the model setup, generate parameters for the model setup based on the received information, a modeling algorithms block operable to select and initialize a neural network modeling algorithm based on the generated model setup, a model building block operable to receive training data and build a neural network model using the training data and the selected neural network modeling algorithm and a model scoring block operable to receive scoring data and generate predictions and/or recommendations using the scoring data and the neural network model.

The software module may further comprise a data preprocessing block operable to receive the training data, process the received training data, and transmit the processed training data to the model building block. The processing performed by the data preprocessing block may comprise normalization of data and/or binning of continuous data into categories.

The software module may further comprise a model integration block operable to integrate the neural network model with scoring data. The software module may further comprise a model analysis block operable to statistically analyze the neural network model. The software module may further comprise a status monitoring block operable to monitor a model-building progress of the model building block and output notification of the model-building progress of the model building block. The model building block may be further operable to monitor the client input for an interrupt. The model building block may be further operable to, in response to receiving an interrupt, abort the model build or checkpoint the model build. The model building block may be further operable to periodically checkpoint a model build.

BRIEF DESCRIPTION OF THE DRAWINGS

The details of the present invention, both as to its structure and operation, can best be understood by referring to the accompanying drawings, in which like reference numbers and designations refer to like elements.

FIG. 8 is an exemplary format of a training data table that may be used by the neural network module shown in FIG. 4.

DETAILED DESCRIPTION OF THE INVENTION

Figure 1:
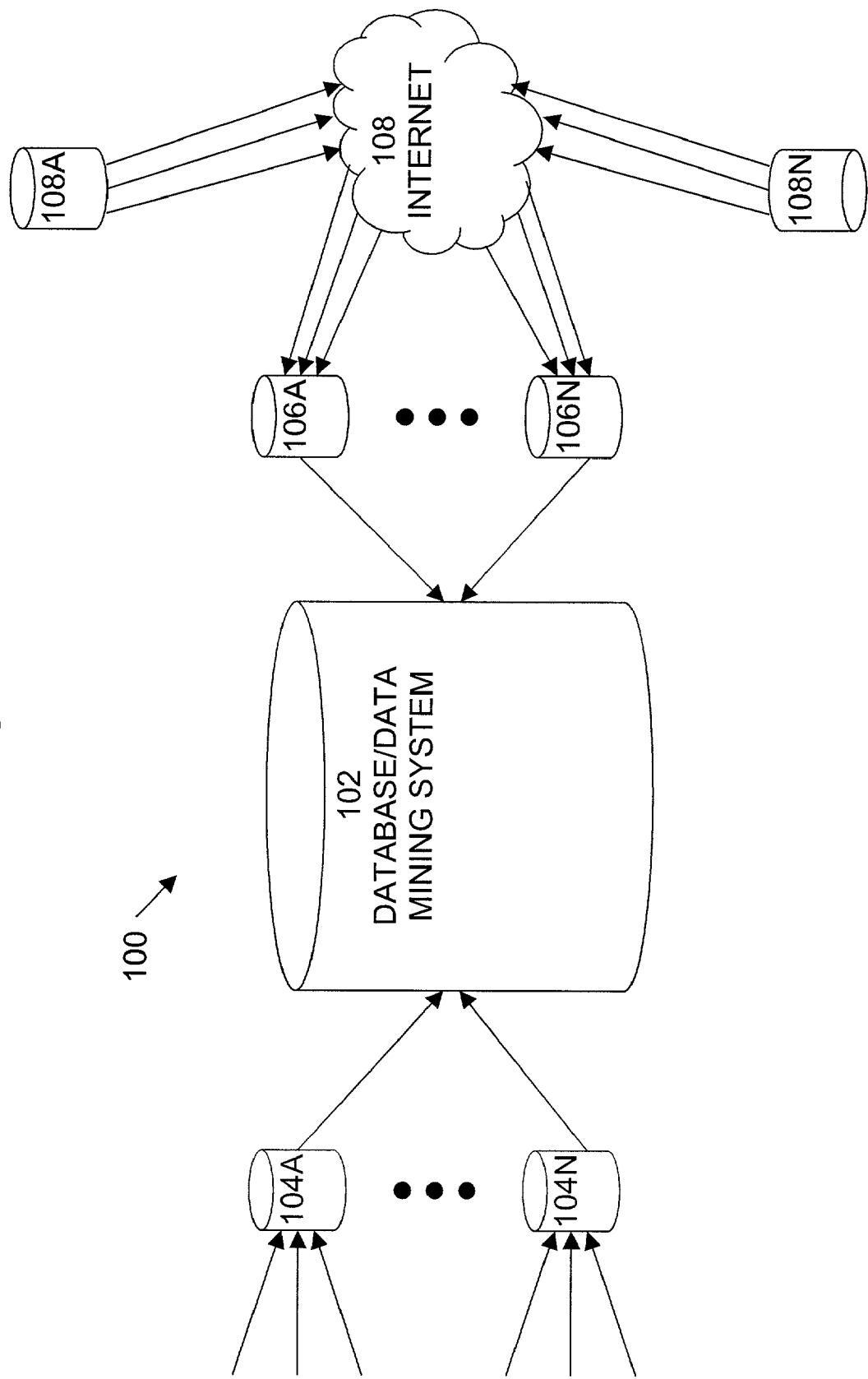
FIG. 1 is an exemplary block diagram of a data mining system, in which the present invention may be implemented.

An exemplary data mining system 100, in which the present invention may be implemented, is shown in FIG. 1. System 100 includes a database/data mining system 102 that is connected to a variety of sources of data. For example, system 102 may be connected to a plurality of internal or proprietary data sources, such as systems 104A–104N. Systems 104A–104N may be any type of data source, warehouse, or repository, including those that are not publicly accessible. Examples of such systems include inventory control systems, accounting systems, scheduling systems, etc. System 102 may also be connected to a plurality of proprietary data sources that are accessible in some way over the Internet 108. Such systems include systems 106A–106N, shown in FIG. 1. Systems 106A–106N may be publicly accessible over the Internet 108, they may be privately accessible using a secure connection technology, or they may be both publicly and privately accessible. System 102 may also be connected to other systems over the Internet 108. For example, system 110 may be privately accessible to system 102 over the Internet 108 using a secure connection, while system 112 may be publicly accessible over the Internet 108.

The common thread to the systems connected to system 102 is that the connected systems all are potential sources of data for system 102. The data involved may be of any type, from any original source, and in any format. System 102 has the capability to utilize and all such data that is available to it.

Figure 2:
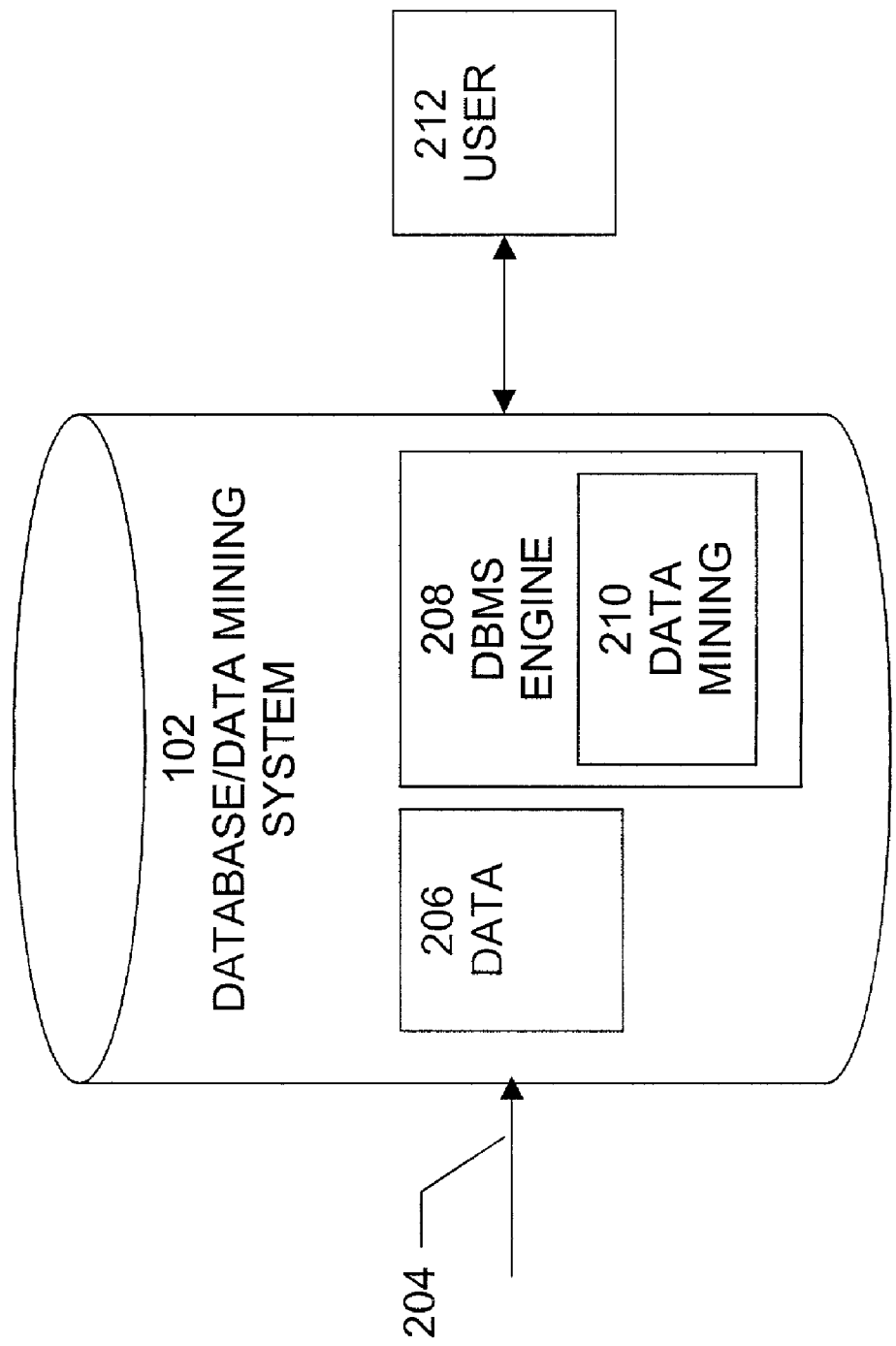
FIG. 2 is an exemplary block diagram of a database/data mining system shown in FIG. 1.

An exemplary embodiment of database/data mining system 102 is shown in FIG. 2. System 102 is a database management system that includes data mining functionality. Database management system 202 is connected to data sources 204, such as the proprietary and public data sources shown in FIG. 1. Database management system includes two main components, data 206, and database management system (DBMS) engine 208. Data 206 includes data, typically arranged as a plurality of data tables, such as relational data tables, as well as indexes and other structures that facilitate access to the data. DBMS engine 208 typically includes software that receives and processes queries of the database, obtains data satisfying the queries, and generates and transmits responses to the queries. DBMS engine 208 also includes data mining block 210, which provides DBMS engine 208 with the capability to obtain data and perform data mining processing on that data, so as to respond to requests for data mining processed data from one or more users, such as user 212.

Figure 3:
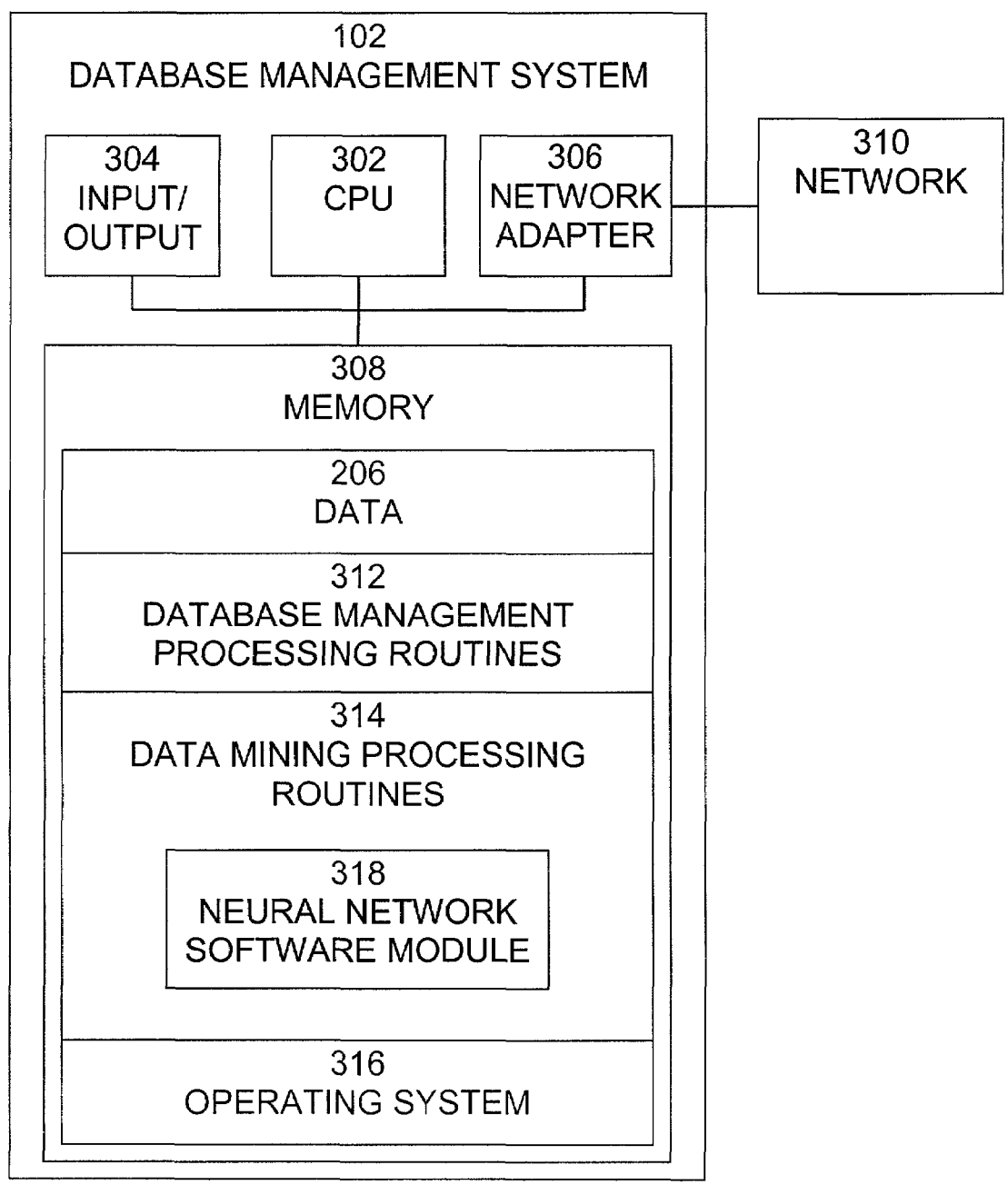
FIG. 3 is an exemplary block diagram of a database/data mining system 102 shown in FIG. 1.

An exemplary block diagram of a database/data mining system 102, shown in FIG. 1, is shown in FIG. 3. Database/data mining system 102 is typically a programmed general-purpose computer system, such as a personal computer, workstation, server system, and minicomputer or mainframe computer. Database/data mining system 102 includes processor (CPU) 302, input/output circuitry 304, network adapter 306, and memory 308. CPU 302 executes program instructions in order to carry out the functions of the present invention. Typically, CPU 302 is a microprocessor, such as an INTEL PENTIUM® processor, but may also be a minicomputer or mainframe computer processor. Input/output circuitry 304 provides the capability to input data to, or output data from, database/data mining system 102. For example, input/output circuitry may include input devices, such as keyboards, mice, touchpads, trackballs, scanners, etc., output devices, such as video adapters, monitors, printers, etc., and input/output devices, such as modems, etc. Network adapter 306 interfaces database/data mining system 102 with network 310. Network 310 may be any standard local area network (LAN) or wide area network (WAN), such as Ethernet, Token Ring, the Internet, or a private or proprietary LAN/WAN.

Memory 308 stores program instructions that are executed by, and data that are used and processed by, CPU 302 to perform the functions of the database/data mining system 102. Memory 308 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 308 includes data 206, database management processing routines 312, data mining processing routines 314, and operating system 316. Data 206 includes data, typically arranged as a plurality of data tables, such as relational database tables, as well as indexes and other structures that facilitate access to the data. Database management processing routines 312 are software routines that provide database management functionality, such as database query processing. Data mining processing routines 314 are software routines that implement the data mining processing performed by the present invention. In particular, data mining processing routines 314 include neural network based software module (neural network module) 318, which performs the neural network based data mining of the present invention. Preferably, this data mining processing is integrated with database management processing. For example, data mining processing may be initiated by receipt of a database query, either in standard SQL or in the form of extended SQL statements, or data mining processing may be initiated from a programming language, such as JAVA. Operating system 320 provides overall system functionality.

Figure 4:
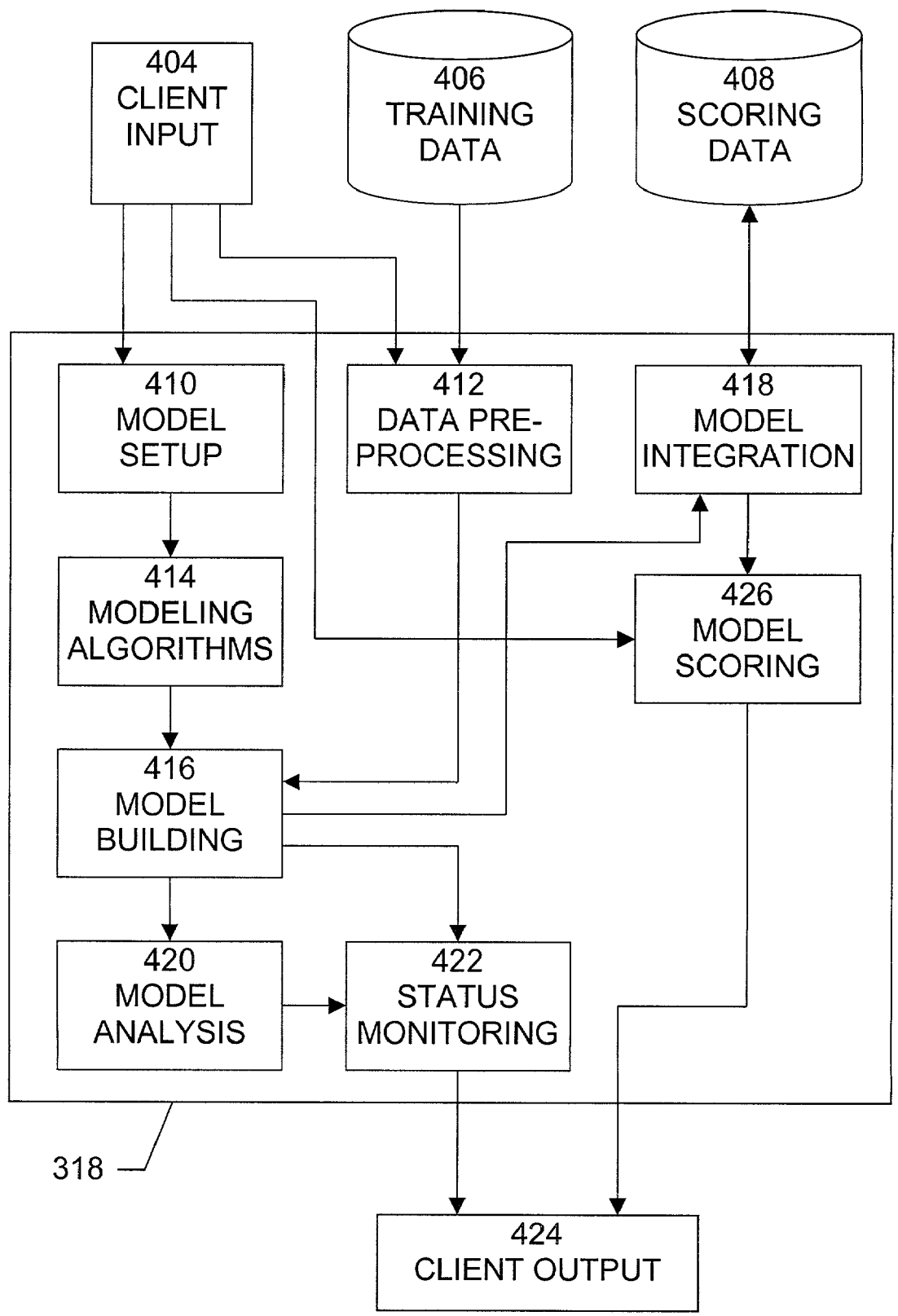
FIG. 4 is an exemplary block diagram of a neural network module for data mining shown in FIG. 3.

A functional block diagram of a neural network module 318 for data mining, according to the present invention, is shown in FIG. 4. Neural network module 318 receives input such as client input 404 and training data 406 and interacts with scoring data 408. Model setup block 410 receives client input 404 that includes information specifying setups of neural network data mining models. For example, client input 404 may include information specifying a number of artificial neurons to be used in a data mining model, a type of neural network model to be built, such as a backpropagation network, radial basis function network, etc., and other information specific to the type of model selected. Model setup block 410 generates the model setups that are used in building the models and generates appropriate parameters for the model setup based on the received information.

Data preprocessing block 412 receives training data 406, preprocesses the training data, and transmits the processed data to model building block 416. Thus, data preprocessing block processes the training data before the data is used to build a model. For example, numeric columns within training data 406 may be normalized to restrict the range of the data or to eliminate outliers. Likewise, columns of continuous data may be binned to form categorical columns, which reduces the number of unique values present in the data. Data preprocessing block 412 may perform default or predefined processing, or data preprocessing block 412 may receive client input that includes information defining the bins to be used or defining the type of normalization to be performed.

Modeling algorithms block 414 selects and initializes the appropriate modeling algorithm based on the model setup that is generated by model setup block 410. This provides the capability to generate models that are appropriate for different modeling needs, as specified by the client. Factors such as speed, data visualization, ease of tuning, on-line, incremental learning, and batch learning may be supported.

Model building block 416 receives a preprocessed training dataset from data preprocessing block 412 and builds a neural network model using the training dataset and the selected neural network modeling algorithm. Model building block 416 builds the neural network model based on the available data columns in the dataset. Columns that have been marked to be ignored, or that are keys, are ignored. The resulting built model is used by model integration block 418 to integrate the model with scoring data 408 that is contained in other datasets. In addition, the neural network model may be deployed into the database system itself, in which case the database system can itself use the model to make predictions.

Model building block 416 monitors client input for interrupts to the model building process. Depending upon the nature of the interrupt, model building block 416 may abort the model build or it may checkpoint the model build for later resumption. Checkpointing involves saving the complete state of the model build, and includes saving all information necessary to resume the model build from the point of interruption. In addition to checkpointing in response to a client interrupt, model building block 416 also periodically checkpoints the model build. Should a system failure occur that interrupts the model build, only the work done since the last checkpoint is lost, rather than the entire model build.

After a model has been built, model analysis block 420 statistically analyzes the model and validates the dataset. Model analysis block 420 computes statistics on the data represented by the neural network model. These statistics may then be used to check if a new dataset was generated by the same data generated mechanism as the dataset used for training the model.

Status monitoring block 422 monitors the model-building progress of model building block 416 and periodically outputs to the client 424 notification of that progress.

Model scoring block 426 receives a scoring dataset, applies the scoring dataset to the built and integrated model, and generates predictions and/or recommendations using the scoring dataset and the model.

Figure 5:
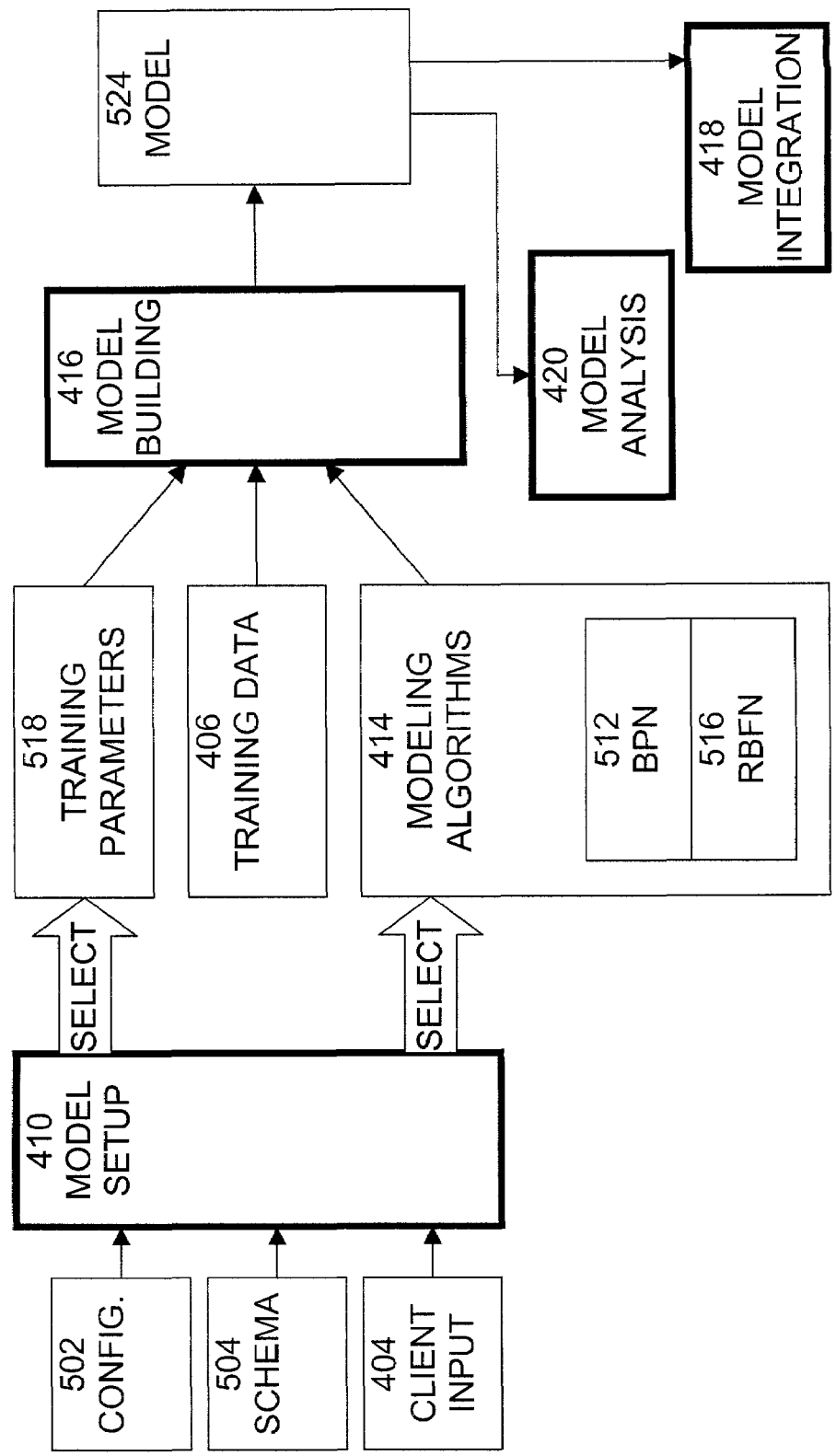
FIG. 5 is an exemplary data flow diagram of a model building process performed by the neural network module shown in FIG. 4.

A data flow diagram of a model building process, performed by neural network module 318, shown in FIG. 4, is shown in FIG. 5. Model building involves building the models, in this case, neural network models, which are used to perform online recommendation and prediction. A configuration 502 defines the information, such as items, products, attributes, etc. that may of interest for the user in a particular universe. A schema 504 defines the types of models that are to be built in specific situations. Client input 404 includes information that allows the user to control the building of neural network data mining models. For example, client input 404 may include information specifying a number of artificial neurons to be used in a data mining model, a type of neural network model to be built, such as a backpropagation network, a radial basis function network, etc., and other parameters that are specific to the type of model selected. The configuration 502, the schema 504, and the client input 404 are input to model setup step 410, which sets up the models for training. In particular, model setup step 410 selects the modeling algorithms 414 that process the training data in order to actually build the models. For example, modeling algorithms 414 may include a backpropagation network 512, a radial basis function network 516, etc. The algorithms that are to be used to build models are selected by model setup step 1106-1 based on the definitions in schema 504, as specified by the client input 404.

In addition, model setup step 410 generates and sets training parameters 518. Training parameters 518 are parameters that are input to the algorithms to control how the algorithms build the models. Training data 406 is data that is input to the algorithms that is used to actually build the models. Training parameters 518, the selected modeling algorithm, and training data 406 are input to model building block 416.

Model building block 416 invokes the selected modeling algorithm, initializes it using the training parameters 518, processes training data 406 using the modeling algorithm, and generates model 524. Model 524 includes information, such as functions, that implements the conditions and decisions that make up an operational model. In particular, neural network models implement a mapping between the input space and the output space. This mapping may be implemented, for example, by a combination of processing nodes, which define the neural network topology, and transfer functions, which define the transfer of information between nodes in the network. Model 524 is input to model analysis block 420, which statistically analyzes the model and validates the dataset. Model analysis block 420 computes statistics on the data represented by the neural network model. These statistics may then be used to check if a new dataset was generated by the same data generated mechanism as the dataset used for training the model. Model 524 is also output to model integration block 418, which integrates model 524 with scoring data that is contained in other datasets.

Figure 6:
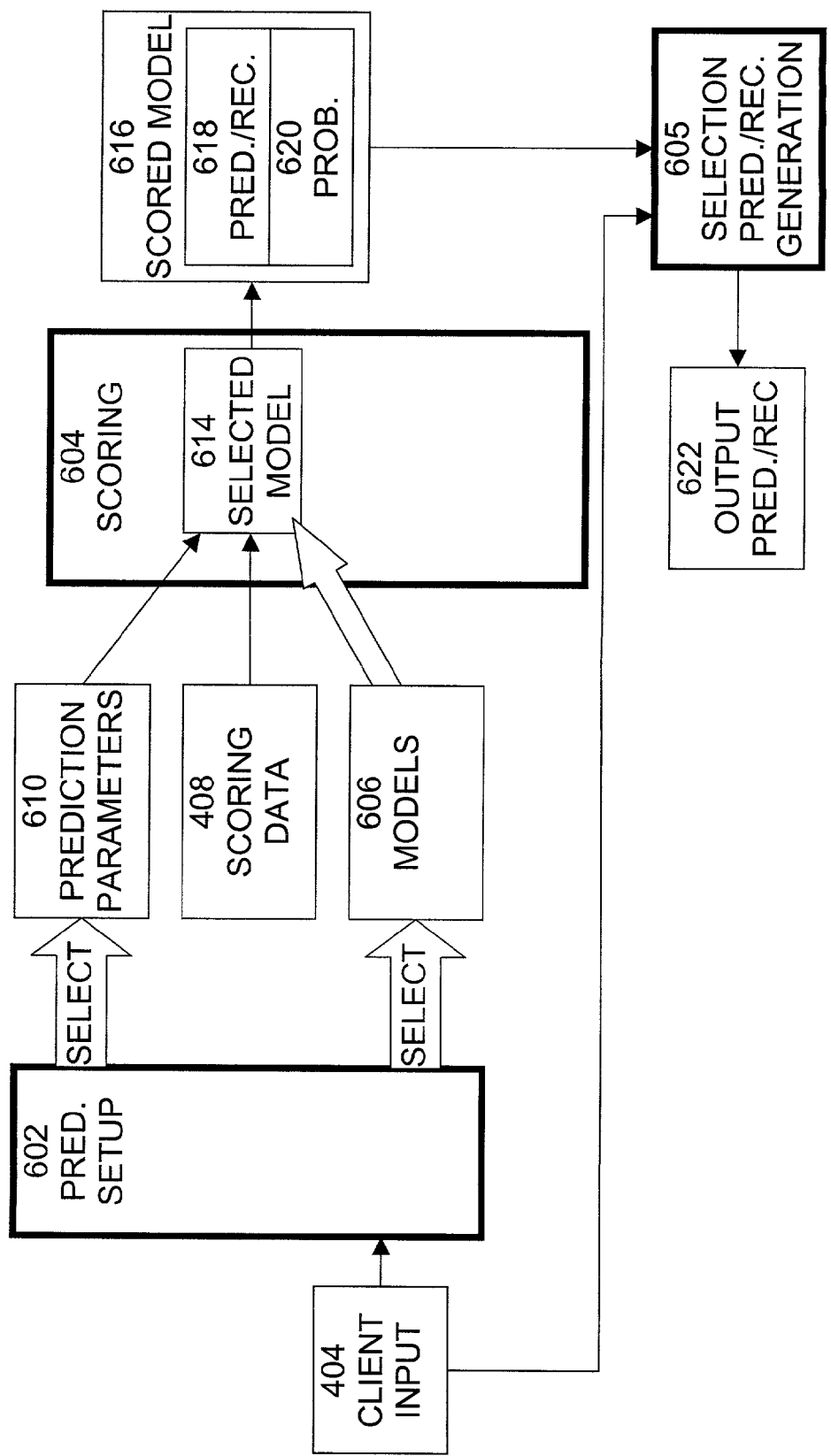
FIG. 6 is an exemplary data flow diagram of a model scoring process performed by the neural network module shown in FIG. 4.

A data flow diagram of a model scoring process is shown in FIG. 6. Client input 404 is input to prediction setup step 602. Client input 404 includes user data and desired results data. User data may include data relating to types predications/recommendations desired by the user, data relating to constraints on the generated predication/recommendation desired by the user. Prediction setup step 602 uses the input user data and desired results data to select models 606, to select and generate prediction parameters 610, and to generate prediction data 612. Models 606 include information that was generated by model building block 416, shown in FIG. 5. Prediction setup step 602 selects a model for use in scoring step 604 based on the user data and on the desired results data included in client input 404. Prediction parameters 610 are parameters that are input to the scoring step 604 to control the scoring of scoring data 408 against the model and are input to the selection and prediction/recommendation process to control the selection of the scored data and the generation of predictions and recommendations. Prediction setup step 602 selects and generate predication parameters 610 for use in scoring step 604 based on the user data and on the desired results data included in client input 404.

The selected model 614, prediction parameters 610, and scoring data 408 are input to scoring step 604. In scoring step 604, each row of scoring data 408 is scored according to selected model 614, as controlled by prediction parameters 610, to generate one or more scores for each row of scoring data 408. The scores for each row of data indicate how closely the row of data matches attributes of the model, how much confidence may be placed in the prediction, how likely each output prediction/recommendation to be true, and other statistical indicators. The generated scored data 616 is output from scoring step 604 and includes predictions/recommendations 618, along with the corresponding probabilities 620 for the scored data.

The scored model 616 is input to selection and prediction/recommendation generation step 605, which evaluates the probabilities associated with each record of scored data 616 and outputs predictions/recommendations 622 based on the scored data. Records may be selected based on prediction parameters 610 provided by the user, for example, to filter records that do not meet some probability threshold. The generated predictions/recommendations are output 622 from step 605 for use in any post data mining processing.

Figure 7:
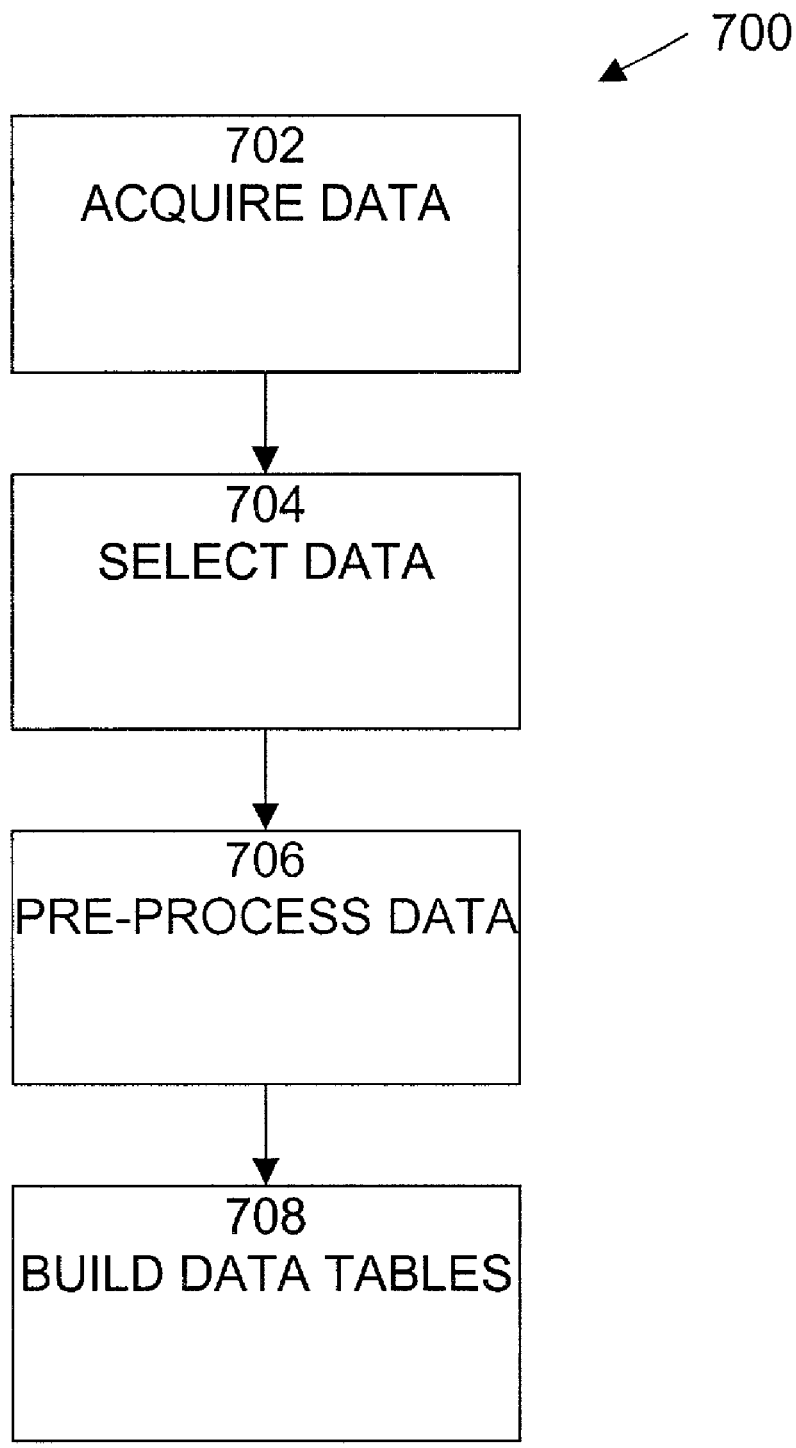
FIG. 7 is an exemplary flow diagram of processing performed by the neural network module shown in FIG. 4.

Processing 700, including processing performed by data preprocessing block 412 is shown in FIG. 7. Process 700 collects and processes data in order to generate data in a form usable by for the data mining processing performed by the present invention. Process 700 begins with step 702, in which training data 406, shown in FIG. 4, is acquired from the data sources with which the data mining system operates, such as corporate databases, which provide corporate customer data, external databases, which provide complementary customer data, Web transaction database, which provide web transaction and visitor data, and Web server database, which provides web server data. In step 704, data that is relevant to the desired output from the system is selected from among the data that has been acquired. In step 706, the selected data is pre-processed to ensure that the data is usable, properly formatted, etc. For example, numeric columns within training data 406 may be normalized to restrict the range of the data or to eliminate outliers. Likewise, columns of continuous data may be binned to form categorical columns, which reduces the number of unique values present in the data. Default or predefined processing may be performed, or client input may be received that includes information defining the bins to be used or defining the type of normalization to be performed. In step 708, the data tables that are used by the system to build neural network models are built and stored.

An exemplary format of a training data table 802 is shown in FIG. 8. Data table 802 includes a plurality of rows or records of data, such as records 804A–804N. Each record represents an individual set of data in data table 802. Each record includes a plurality of fields of data, each field containing an individual piece of data of a defined type and subject matter. When arranged in a tabular format, the fields of the records form columns such as columns 806A–806B, with each column representing a particular type and subject matter of data. For example, in FIG. 8, column 806A represents "NAME" and contains names, column 806B represents "ADDRESS" and contains addresses. Likewise, record 804A includes a name field and an address field. In order to build a neural network model from a dataset, a set of records is processed. The data in the columns of the set of records is preprocessed by data preprocessing block 412, then processed to form the neural network model.

Figure 9:
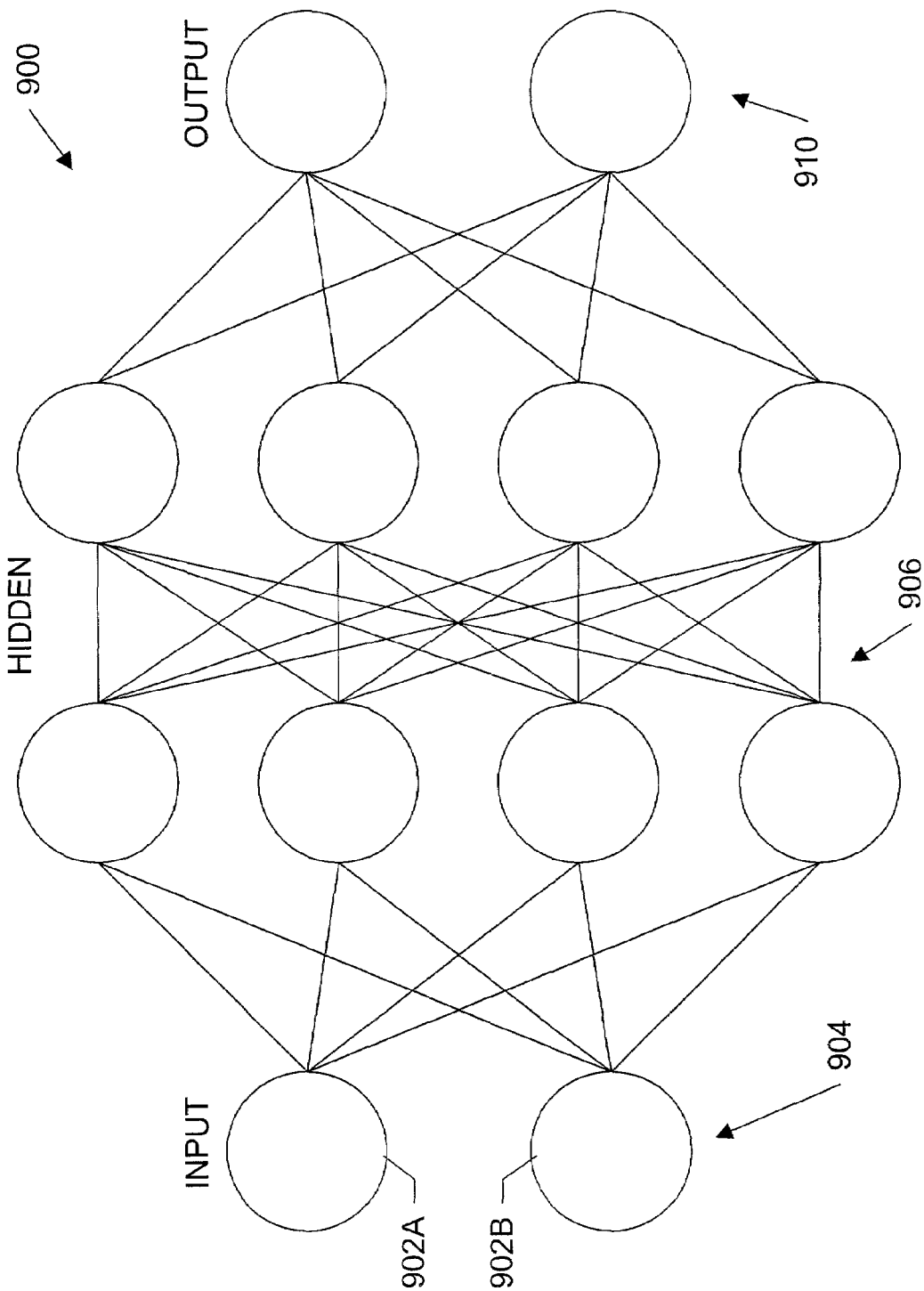
FIG. 9 illustrates an example of an artificial neural network of a type that may be used in a neural network data mining model.

An example of an artificial neural network of a type that may be used in a neural network data mining model is shown in FIG. 9. Neural networks, such as network 900, are typically organized in layers. Layers are made up of a number of interconnected nodes, such as nodes 902A and 902B, each of which contains an activation function. Patterns are presented to the network via the input layer 904, which communicates to one or more hidden layers 906 where the actual processing is done via a system of weighted connections 908. The hidden layers then link to an output layer 910 where the answer is output.

Most artificial neural networks contain some form of learning rule, which modifies the weights of the connections according to the input patterns that are presented. In a sense, artificial neural networks learn by example as do their biological counterparts.

There are many different kinds of learning rules used by neural networks. A typical well-known learning rule is the delta rule. The delta rule is often utilized by the most common class of artificial neural networks, which are called backpropagational neural networks (BPNNs). Backpropagation refers to the backwards propagation of error in the neural network.

Figure 10:
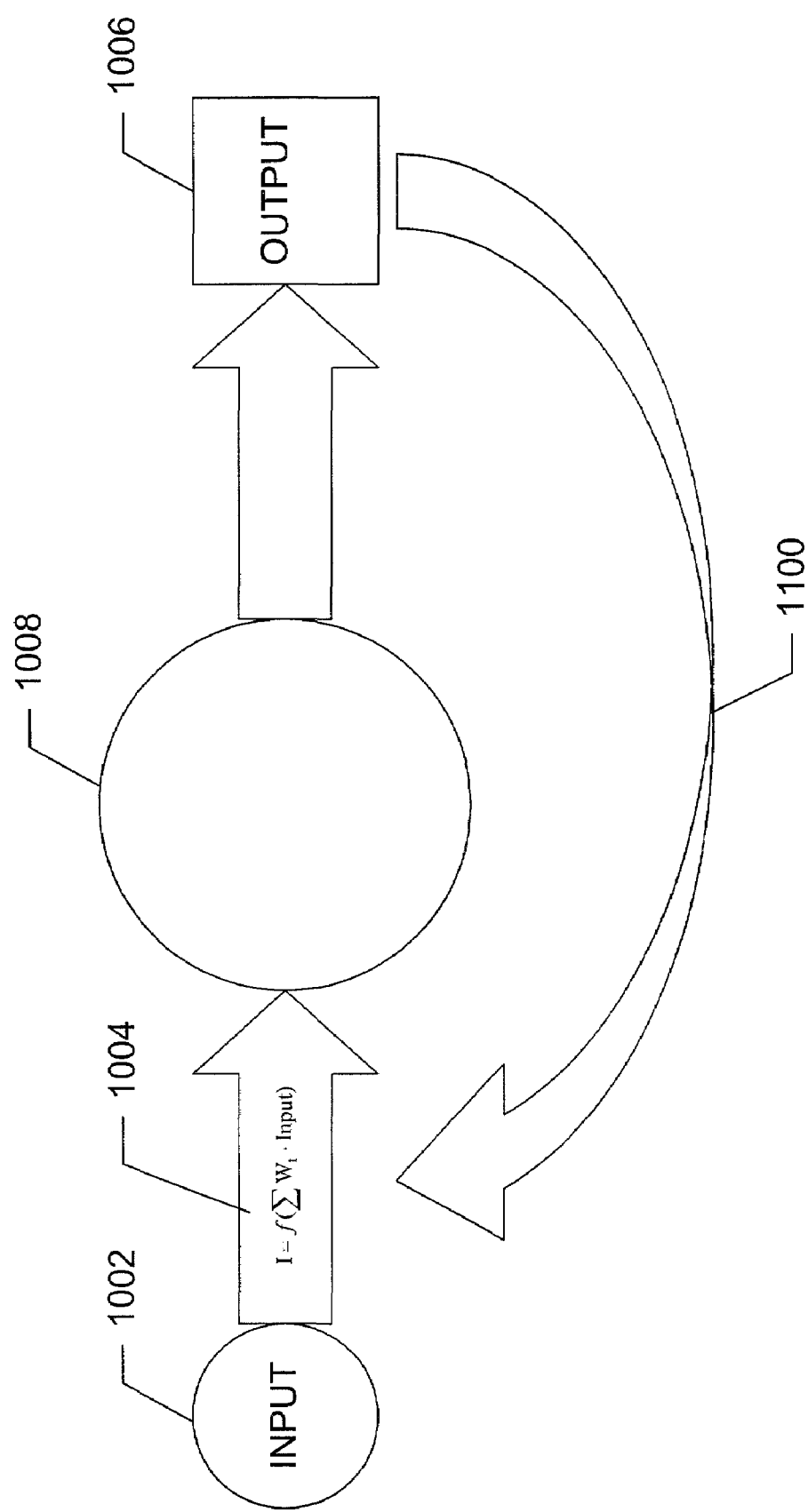
FIG. 10 illustrates an example of a backprogagation learning process that may be implemented in the artificial neural network shown in FIG. 9.

With the delta rule, as with other types of backpropagation, learning is a supervised process that occurs with each cycle or epoch. This backpropagation learning process is shown in FIG. 10. Each time the network is presented with a new input pattern 1002 (a new cycle or epoch), the input is filtered through a weight function 1004, such as the function: $I=f(\Sigma W_i \cdot Input)$, where $W_i$ are the weights. The output 1006 is generated by a combination of various nodes in the hidden layers 1008. Within each hidden layer node is an activation function that polarizes network activity and helps stabilize it. The weights are adjusted through a forward activation flow of outputs, and the backwards error propagation of weight adjustments using a backpropagation function, such as $$W_{new} = W_{old} - \beta \nabla_W E, \text{ where } -\nabla_W E$$

is the gradient of the error with respect to the weight W. More simply, when a neural network is initially presented with a pattern, it makes a random guess as to what it might be. It then sees how far its answer was from the actual one and makes an appropriate adjustment to its connection weights.

Backpropagation performs a gradient descent within the solution's vector space towards a global minimum along the steepest vector of the error surface. The global minimum is that theoretical solution with the lowest possible error. The error surface itself is a hyperparaboloid but is seldom smooth. Indeed, in most problems, the solution space is quite irregular with numerous 'pits' and 'hills', which may cause the network to settle down in a local minimum, which is not the best overall solution. When the error has reached the global minimum, or at least a local minimum of acceptable quality, the error function may be said to have converged. Alternatively to using just the error function, a cost function may be used, as well.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A software module for performing a neural network based data mining in an electronic data processing system comprising:
   a model setup block operable to receive client input including information specifying a setup of a neural network data mining model, generate the model setup, generate parameters for the model setup based on the received information;
   a modeling algorithms block operable to select and initialize a neural network modeling algorithm based on the generated model setup;
   a model building block operable to receive training data and build a neural network model using the training data and the selected neural network modeling algorithm; and
   a model scoring block operable to receive scoring data and generate predictions and/or recommendations using the scoring data and the neural network model.

2. The software module of claim 1, further comprising:
   a data preprocessing block operable to receive the training data, process the received training data, and transmit the processed training data to the model building block.

3. The software module of claim 2, wherein the processing performed by the data preprocessing block comprises normalization of data and/or binning of continuous data into categories.

4. The software module of claim 2, further comprising:
   a model integration block operable to integrate the neural network model with scoring data.

5. The software module of claim 4, further comprising:
   a model analysis block operable to statistically analyze the neural network model.

6. The software module of claim 5, further comprising:
   a status monitoring block operable to monitor a model-building progress of the model building block and output notification of the model-building progress of the model building block.

7. The software module of claim 6, wherein the model building block is further operable to monitor the client input for an interrupt.

8. The software module of claim 7, wherein the model building block is further operable to, in response to receiving an interrupt, abort the model build or checkpoint the model build.

9. The software module of claim 6, wherein the model building block is further operable to periodically checkpoint a model build.

10. A computer program product for performing a neural network based data mining in an electronic data processing system, comprising:
    a computer readable medium;
    computer program instructions, recorded on the computer readable medium, executable by a processor, for implementing a software module comprising:
    a model setup block operable to receive client input including information specifying a setup of a neural network data mining model, generate the model setup, generate parameters for the model setup based on the received information;
    a modeling algorithms block operable to select and initialize a neural network modeling algorithm based on the generated model setup;
    a model building block operable to receive training data and build a neural network model using the training data and the selected neural network modeling algorithm; and
    a model scoring block operable to receive scoring data and generate predictions and/or recommendations using the scoring data and the neural network model.

11. The computer program product of claim 10, further comprising:
    a data preprocessing block operable to receive the training data, process the received training data, and transmit the processed training data to the model building block.

12. The computer program product of claim 11, wherein the processing performed by the data preprocessing block comprises normalization of data and/or binning of continuous data into categories.

13. The computer program product of claim 11, further comprising:
    a model integration block operable to integrate the neural network model with scoring data.

14. The computer program product of claim 13, further comprising:
    a model analysis block operable to statistically analyze the neural network model.

15. The computer program product of claim 14, further comprising:
    a status monitoring block operable to monitor a model-building progress of the model building block and output notification of the model-building progress of the model building block.

16. The computer program product of claim 15, where in the model building block is further operable to monitor the client input for an interrupt.

17. The computer program product of claim 16, wherein the model building block is further operable to, in response to receiving an interrupt, abort the model build or checkpoint the model build.

18. The computer program product of claim 17, wherein the model building block is further operable to periodically checkpoint a model build.

19. A system for performing a neural network based data mining comprising:
    a processor operable to execute computer program instructions; and
    a memory operable to store computer program instructions executable by the processor, the computer program instructions comprising a software module comprising:
    a model setup block operable to receive client input including information specifying a setup of a neural network data mining model, generate the model setup, generate parameters for the model setup based on the received information;
    a modeling algorithms block operable to select and initialize a neural network modeling algorithm based on the generated model setup;

a model building block operable to receive training data and build a neural network model using the training data and the selected neural network modeling algorithm; and a model scoring block operable to receive scoring data and generate predictions and/or recommendations using the scoring data and the neural network model.

20. The system of claim 19, wherein the software module further comprises:

a data preprocessing block operable to receive the training data, process the received training data, and transmit the processed training data to the model building block.

21. The system of claim 20, wherein the processing performed by the data preprocessing block comprises normalization of data and/or binning of continuous data into categories.

22. The system of claim 20, wherein the software module further comprises:

a model integration block operable to integrate the neural network model with scoring data.

23. The system of claim 22, wherein the software module further comprises:

a model analysis block operable to statistically analyze the neural network model.

24. The system of claim 23, wherein the software module further comprises:

a status monitoring block operable to monitor a model-building progress of the model building block and output notification of the model-building progress of the model building block.

25. The system of claim 24, wherein the model building block is further operable to monitor the client input for an interrupt.

26. The system of claim 25, wherein the model building block is further operable to, in response to receiving an interrupt, abort the model build or checkpoint the model build.

27. The system of claim 26, wherein the model building block is further operable to periodically checkpoint a model build.

* * * * *